United States Patent
Hayakawa et al.

(10) Patent No.: US 12,206,971 B2
(45) Date of Patent: Jan. 21, 2025

(54) INFORMATION PROCESSING SYSTEM HAVING A MIRROR FOR SWITCHING A GAZE DIRECTION OF AN IMAGING UNIT

(71) Applicant: THE UNIVERSITY OF TOKYO, Tokyo (JP)

(72) Inventors: Tomohiko Hayakawa, Tokyo (JP); Yuriko Ezaki, Tokyo (JP); Yushi Moko, Tokyo (JP); Masatoshi Ishikawa, Tokyo (JP)

(73) Assignee: THE UNIVERSITY OF TOKYO (JP)

( * ) Notice: Subject to any disclaimer, the term of this patent is extended or adjusted under 35 U.S.C. 154(b) by 0 days.

(21) Appl. No.: 18/010,931

(22) PCT Filed: Jun. 11, 2021

(86) PCT No.: PCT/JP2021/022280
§ 371 (c)(1),
(2) Date: Dec. 16, 2022

(87) PCT Pub. No.: WO2021/261293
PCT Pub. Date: Dec. 30, 2021

(65) Prior Publication Data
US 2024/0236455 A1    Jul. 11, 2024

(30) Foreign Application Priority Data

Jun. 23, 2020 (JP) ................. 2020-108252

(51) Int. Cl.
*H04N 23/55* (2023.01)
*H04N 23/61* (2023.01)

(52) U.S. Cl.
CPC ............. *H04N 23/55* (2023.01); *H04N 23/61* (2023.01)

(58) Field of Classification Search
CPC ........ H04N 23/55; H04N 23/61; H04N 23/00; H04N 23/58; H04N 23/60; G03B 15/00; G03B 37/02; G03B 37/04
See application file for complete search history.

(56) References Cited

U.S. PATENT DOCUMENTS

| | | | |
|---|---|---|---|
| 10,890,520 B2 * | 1/2021 | Goda | G01N 15/14 |
| 2010/0166293 A1 * | 7/2010 | Sugita | G01B 9/02085 |
| | | | 356/479 |

(Continued)

FOREIGN PATENT DOCUMENTS

| | | |
|---|---|---|
| JP | 2014-240801 A | 12/2014 |
| JP | 2015-082710 A | 4/2015 |

(Continued)

OTHER PUBLICATIONS

International Search Report (English and Japanese) issued in PCT/JP2021/022280, mailed Jun. 11, 2021; ISA/JP (5 pages).

*Primary Examiner* — Twyler L Haskins
*Assistant Examiner* — Angel L Garces-Rivera
(74) *Attorney, Agent, or Firm* — Harness, Dickey & Pierce, P.L.C.

(57) ABSTRACT

An information processing system is provided. The system is mounted on a mobile entity and includes: an imaging unit configured to capture an image of a subject; and a plurality of mirror units, wherein: at least a first mirror unit and a second mirror unit of the plurality of mirror units are disposed on an optical axis of the imaging unit, the first mirror unit is used in such a manner that an imaging range of the imaging unit is a constant area of the subject, and the second mirror unit is used to switch a gaze direction of the imaging unit.

10 Claims, 17 Drawing Sheets

(56) References Cited

U.S. PATENT DOCUMENTS

| | | | |
|---|---|---|---|
| 2016/0161734 A1* | 6/2016 | Oku | G03B 17/56 |
| | | | 359/225.1 |
| 2016/0261798 A1 | 9/2016 | Ishikawa et al. | |
| 2020/0145568 A1* | 5/2020 | Vollmerhausen | H04N 23/6812 |

FOREIGN PATENT DOCUMENTS

| | | |
|---|---|---|
| JP | 2015-222913 A | 12/2015 |
| JP | 2017-183804 A | 10/2017 |

* cited by examiner

MOVING DIRECTION OF MOBILE ENTITY (ME)

FIG. 16

INFORMATION PROCESSING SYSTEM HAVING A MIRROR FOR SWITCHING A GAZE DIRECTION OF AN IMAGING UNIT

CROSS REFERENCE TO RELATED APPLICATIONS

This application is a U.S. National Phase Application under 35 U.S.C. 371 of International Application No. PCT/JP2021/022280, filed on Jun. 11, 2021, which claims priority to Japanese Patent Application No. 2020-108252, filed on Jun. 23, 2020. The entire disclosures of the above applications are expressly incorporated by reference herein

TECHNICAL FIELD

This invention relates to an information processing system.

BACKGROUND ART

Patent Application Publication JP2015-82710A discloses a technique for continuously acquiring images with minimal blur in an environment where the camera is moving.

However, with the technique in Patent Application Publication JP2015-82710A, when a single high-speed camera with high-resolution was installed in the inspection vehicle, it was necessary to drive through the tunnel 60 times to capture a 180-degree image of the wall surface in the tunnel, for example, when the camera angle of view was 3 degrees.

SUMMARY

According to an aspect of the invention, there is provided an information processing system mounted on a mobile entity, comprising: an imaging unit configured to capture an image of a subject; and a plurality of mirror units, wherein: at least a first mirror unit and a second mirror unit of the plurality of mirror units are disposed on an optical axis of the imaging unit, the first mirror unit is used in such a manner that an imaging range of the imaging unit is a constant area of the subject, and the second mirror unit is used to switch a gaze direction of the imaging unit.

BRIEF DESCRIPTION OF THE DRAWINGS

FIG. 16 shows an example of an image with a string of text.

DETAILED DESCRIPTION

Hereinafter, embodiments of the present invention will be described with reference to the drawings. Various features described in the embodiment below can be combined with each other.

A program for realizing a software in the present embodiment may be provided as a non-transitory computer readable medium that can be read by a computer or may be provided for download from an external server or may be provided in such a manner that the program can be activated on an external computer to realize functions thereof on a client terminal (so-called cloud computing).

In the present embodiment, the "unit" may include, for instance, a combination of hardware resources implemented by circuits in a broad sense and information processing of software that can be concretely realized by these hardware resources. Further, various information is performed in the present embodiment, and the information thereof can be represented by high and low signal values as a bit set of binary numbers composed of 0 or 1, and communication/calculation can be performed on a circuit in a broad sense.

Further, the circuit in a broad sense is a circuit realized by combining at least an appropriate number of a circuit, a circuitry, a processor, a memory, and the like. In other words, it is a circuit includes Application Specific Integrated Circuit (ASIC), Programmable Logic Device (e.g., Simple Programmable Logic Device (SPLD), Complex Programmable Logic Device (CPLD), and Field Programmable Gate Array (FPGA)), and the like.

Embodiment 1

1. System Configuration

Figure 1:
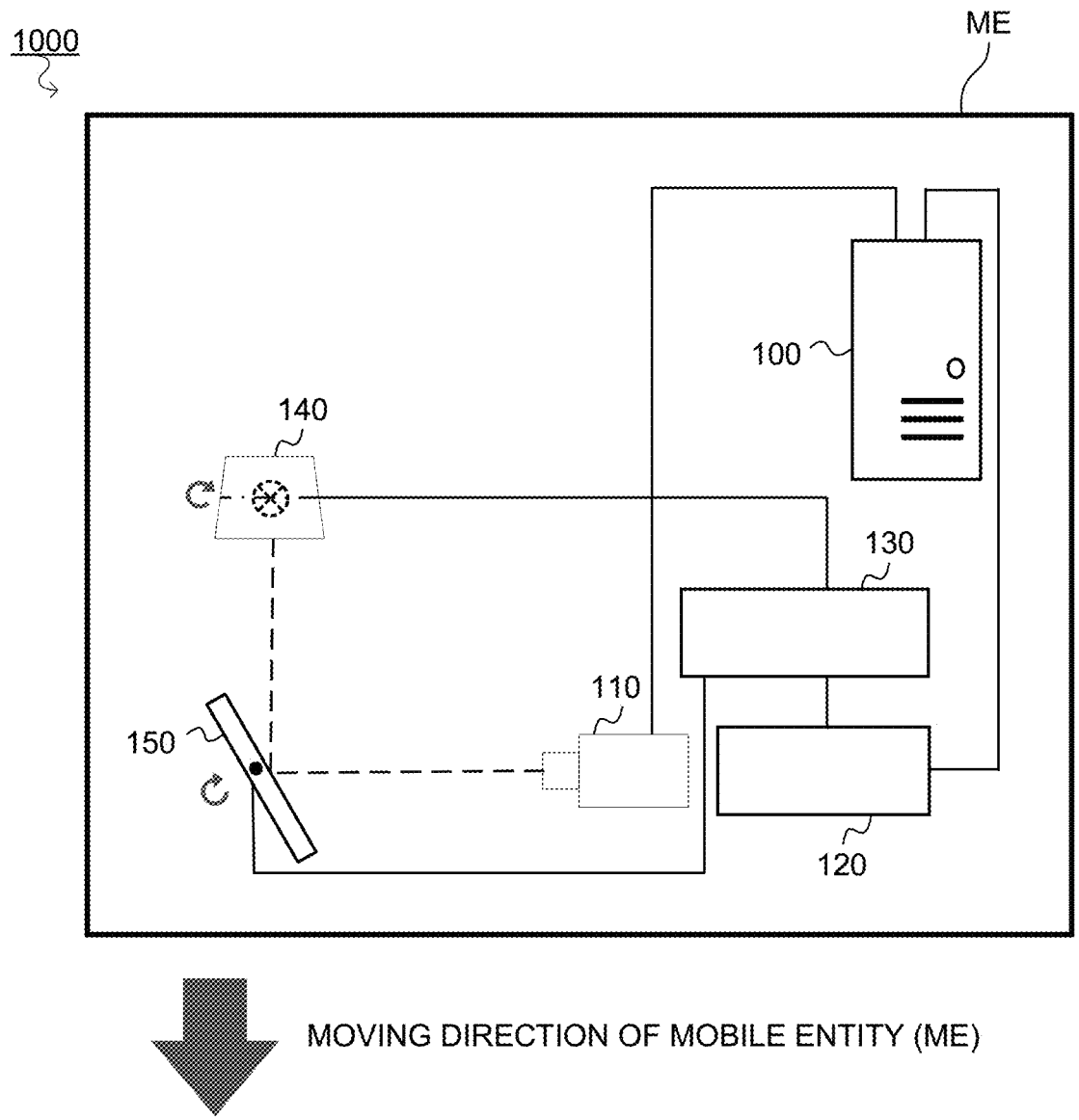
FIG. 1 shows an example of the system configuration of an information processing system.

FIG. 1 shows an example of the system configuration of an information processing system 1000. The information processing system 1000 is mounted on a mobile entity (ME). The information processing system 1000 includes, as a system configuration, an information processing unit 100, an imaging unit 110, a function generator 120, a servo driver 130, and a drivable mirror units 140 and 150. For simplicity of explanation, FIG. 1 shows two mirror units included in the information processing system 1000, but it is not limited thereto and there may be more than two mirror units. An example of a drivable mirror unit is a galvanometer mirror, but is not limited to the galvanometer mirror; for example, it may be a polygon mirror, a deformable mirror, or the like. The mirror units 140 and 150 are examples of a plurality of mirror units.

The information processing unit 100 controls the overall processing of the information processing system 1000. The function generator 120 generates AC voltage signals with arbitrary frequencies and waveforms. The servo driver 130 controls the rotation angle of the mirror unit 140 and the mirror unit 150 based on instructions from the function generator 120.

The imaging unit 110 is configured to capture a subject. The imaging unit 110 is employed with a high image capture rate (frame rate), so-called high-speed vision. The frame rate is, for example, 100 fps or higher, preferably 250 fps or higher, and more preferably 500 fps or 1000 fps. Specifically, for example, the frame rate may be 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1125, 1150, 1175, 1200, 1225, 1250, 1275, 1300, 1325, 1350, 1375, 1400, 1425, 1450, 1475, 1500, 1525, 1550, 1575, 1600, 1625, 1650, 1675, 1700, 1725, 1750, 1775, 1800, 1825, 1850, 1875, 1900, 1925, 1950, 1975, 2000 fps (Hertz), and may be in a range between any two of the numerical values illustrated herein.

The mirror unit 140 and the mirror unit 150 are disposed on the optical axis of the imaging unit 110. When the mirror unit 140 or the mirror unit 150 is driven, the optical axis of the imaging unit 110 changes, thereby controlling the imaging range or the gaze of the imaging unit 110 as desired.

The mirror unit 140 is used in such a manner that the imaging range of imaging unit 110 is a constant area of the subject. The mirror unit 140 is an example of a first mirror unit. The mirror unit 140 is used in such a manner that the imaging range of the imaging unit 110 is a constant area of the subject during the exposure time in at least one frame of the imaging unit 110. The mirror unit 140 is also used to control the gaze direction in the opposite direction of the movement of the mobile entity.

The mirror unit 150 is used to switch the gaze direction of the imaging unit 110. The mirror unit 150 is an example of a second mirror unit. The mirror unit 150 is used to control the gaze direction perpendicular to the direction of movement of the mobile entity.

2. Hardware Configuration of Information Processing Apparatus 100

Figure 2:
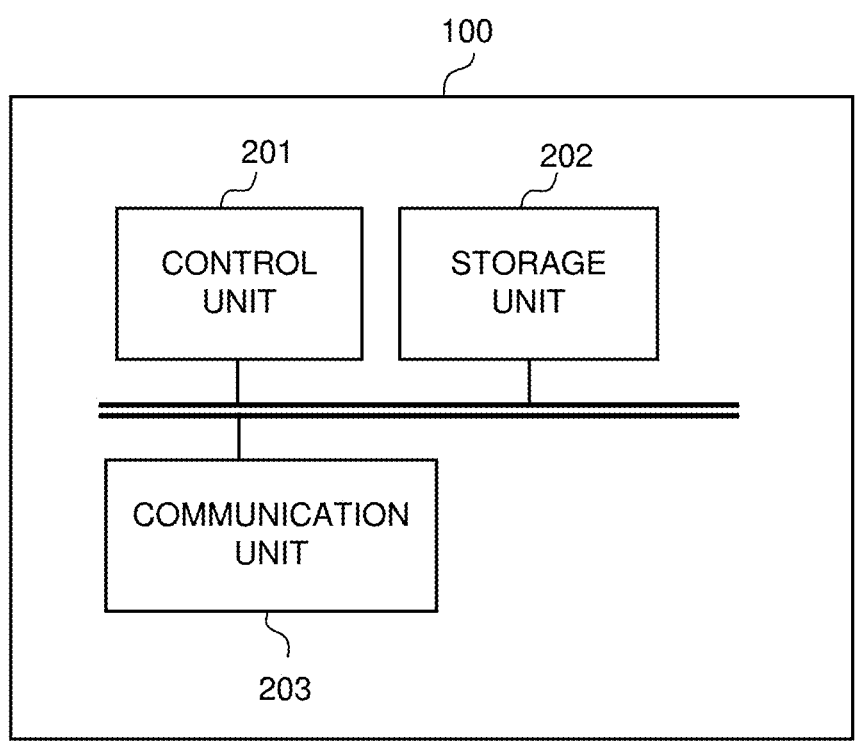
FIG. 2 shows an example of the hardware configuration of an information processing apparatus.

FIG. 2 shows an example of the hardware configuration of information processing apparatus 100. The information processing apparatus 100 includes a control unit 201, a storage unit (memory) 202, and a communication unit 203 as a hardware configuration. The control unit 201 controls the entire information processing apparatus 100. The storage unit 202 stores programs, data, etc. used when the control unit 201 executes processing based on the programs. When the control unit 201 executes processing based on the program stored in the storage unit 202, the functions, etc. shown in FIG. 3 below are realized. The communication unit 203 controls communication with other devices, etc. The hardware configuration of the information processing apparatus 100 is an example, and the information processing apparatus 100 may include an input unit, a display unit, and the like in addition to the configuration shown in FIG. 2 as a hardware configuration.

3. Functional Configuration of Information Processing Apparatus 100

Figure 3:
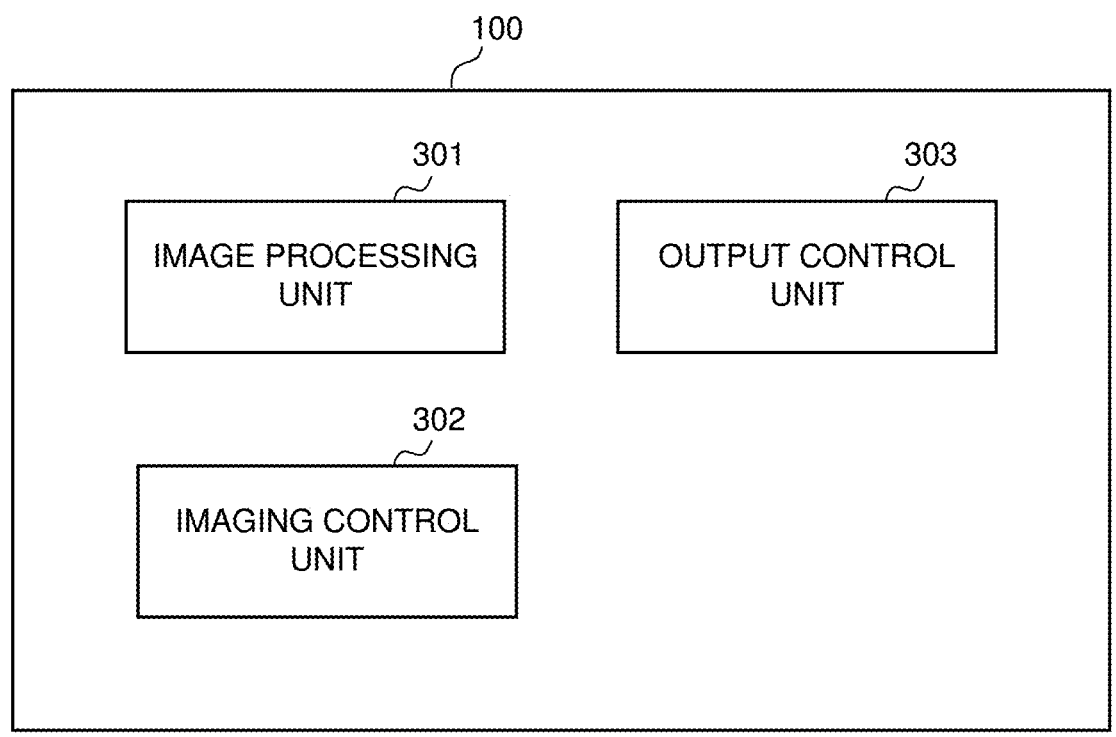
FIG. 3 shows an example of the functional configuration of the information processing apparatus.

FIG. 3 shows an example of the functional configuration of the information processing apparatus 100. The information processing apparatus 100 includes, as the functional configuration thereof, an image processing unit 301, an imaging control unit 302 and an output control unit 303.

(Image Processing Unit 301)

The image processing unit 301 performs predetermined image processing on the captured image received from the imaging unit 110. For example, if the mobile entity is a vehicle and the subject is the road surface, the image processing unit 301 performs the predetermined image processing on the captured image of the road surface to detect cracks, unevenness, etc. For example, if the mobile entity is a vehicle and the subject is a wall surface in a tunnel, the image processing unit 301 performs the predetermined image processing on the captured image of the wall surface in the tunnel to detect cracks, peeling concrete, rust, etc. For example, if the mobile entity is a flying object such as an airplane or a drone, and the subject is a structure on the ground, the image processing unit 301 performs the predetermined image processing on the aerial image to detect a structure with the predetermined shape. If the mobile entity is a vehicle moving in a factory or a robot moving in a factory, and the subject is factory equipment, the image processing unit 301 performs the predetermined image processing on the captured image of the factory equipment to detect cracks, leaks, missing equipment, etc, in the factory equipment. The mobile entity is not limited to a vehicle, a flying object or a moving robot, but may also be a train, etc.

(Imaging Control Unit 302)

The imaging control unit 302 determines the value of the control signal based on, for example, PD control, PI control or PID control. The control signal is then transmitted from the communication unit 203 to the mirror unit 140, and the mirror unit 140 is controlled to the desired angle. The same is true for control with respect to the mirror unit 150. Each coefficient for control is set to a preferred value as needed. The value of the control signal is defined in terms of voltage.

In this embodiment, the imaging control unit 302 is configured to control the mirror unit 140 in such a manner that the imaging range of the imaging unit 110 is a constant area of the subject. The imaging control unit 302 is also configured to control the mirror unit 150 to switch the gaze direction of the imaging unit 110. More specifically, the imaging control unit 302 is configured to control the mirror unit 150 so as to switch the gaze direction of the imaging unit 110 based on the input of a pulse signal based on the resonance frequency of the mirror unit 150. Here, the T, the width of the pulse signal, is represented as $T=2n\pi/\omega r$ where or is the resonance frequency (n is a natural number greater than or equal to zero). The height of the pulse signal is controlled to be greater than the height corresponding to the maximum stroke of the mirror unit 150.

Here, the imaging control unit 302 determines the resonance frequency of the mirror unit 150 based on the captured image captured by the imaging unit 110. More specifically, the imaging control unit 302 specifics the luminance components of the same position in the consecutive images captured by the imaging unit 110, that are common to the consecutive images captured by the imaging unit 110. The imaging control unit 302 analyzes the frequency indicating the period of change of the luminance component of the specified pixel and generates a dominant frequency. The imaging control unit 302 statistically analyzes the dominant frequency, images the average value, generates the dominant frequency image, and analyzes the dominant frequency image. The imaging control unit 302 obtains the resonance frequency of the mirror unit 150 as a result of the analysis.

The imaging control unit 302 may be configured to correct the width and height of the pulse signal based on the output signal from the mirror unit 150. Here, since the width of the first rising pulse is determined by the value of the resonance frequency and is a discrete value, the imaging control unit 302 can adjust the height of the pulse signal since the optimal pulse height for that discrete value is unique. The imaging control unit 302 may also use the pulse signal as input and solve the problem of setting the width and height as the parameters thereof. In other words, the imaging control unit 302 may solve the input signal waveform optimization problem. This configuration allows the input pulse signal to be corrected accordingly even when the resonance frequency of the mirror unit 150 changes due to aging or other factors.

(Output Control Unit 303)

The output control unit 303 outputs the results of image processing executed by the image processing unit 301. The output control unit 303 may output the results of image processing by storing the results in the storage unit 202, by displaying the results on an unshown display unit, or by transmitting the results to other devices that can communicate with the information processing unit 100.

4. Information Processing

Figure 4:
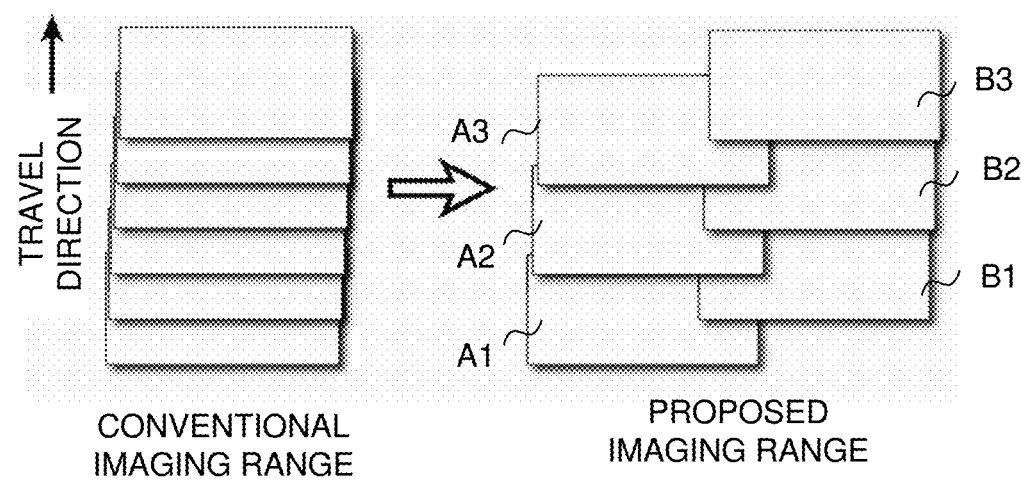
FIG. 4 shows an example of the imaging range using the proposed method.
Figure 5:
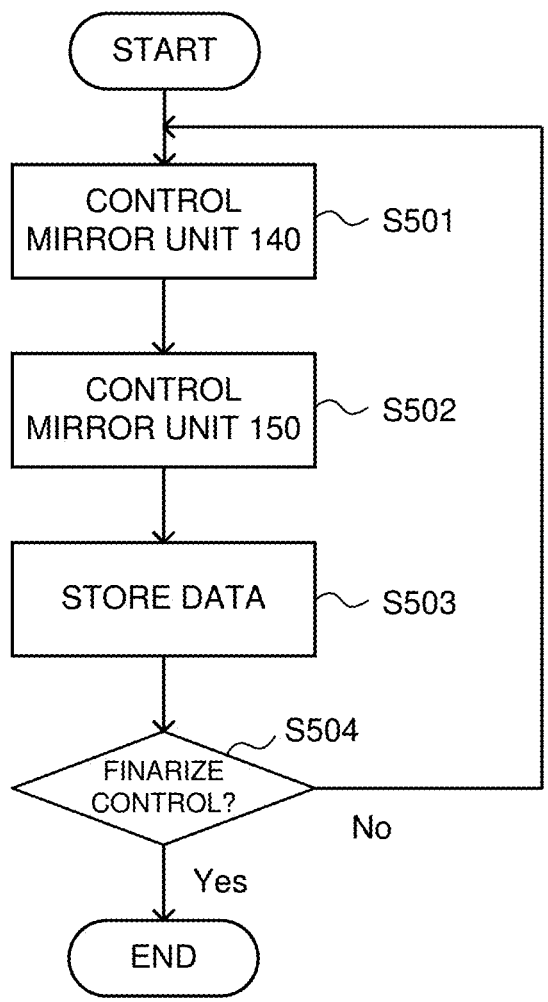
FIG. 5 is a flowchart showing an example of the information processing executed by the information processing apparatus.

FIG. 4 shows an example of an imaging range. FIG. 5 is a flowchart showing an example of information processing of the information processing unit 100. In the information processing of FIG. 5, the imaging control unit 302 is described as always acquiring images from the imaging unit 110.

In step S501, the imaging control unit 302 controls the mirror unit 150 in such a manner that the imaging range becomes the next imaging range.

Next, in step S502, the imaging control unit 302 controls the mirror unit 140 to continue the imaging range for a predetermined time while the mobile entity is moving. This control eliminates motion blur.

Next, in step S503, the imaging control unit 302 controls the data captured by the imaging unit 110 to be stored in the storage unit 202, etc., following the previous data.

Next, in step S504, the imaging control unit 302 determines whether to terminate the control of the image capture. If the imaging control unit 302 determines to terminate the control of the image capture, terminating the information processing shown in FIG. 4. If the imaging control unit 302 determines not to terminate the control of image capture, returning to step S501. For example, the imaging control unit 302 determines that the control of the image capture is terminated when receiving an instruction to terminate the control of the image capture via an unshown input device or the like, or when receiving a signal from another device via the communication unit 203 that the control of the image capture is terminated.

Specifically describing the process in FIG. 4, at first, in step S501, the imaging control unit 302 controls the mirror unit 150 in such a manner that the imaging area becomes the imaging area A1. In step S502, the imaging control unit 302 controls the mirror unit 140 in such a manner that the imaging area A1 continues to be the imaging area for a predetermined frame (e.g., one frame) while the mobile entity is moving. In step S503, the imaging control unit 302 controls the image data of the imaging area A1 to be stored in the storage unit 202. Next, in step S504, the imaging control unit 302 determines that the control of the image capture is not terminated and returns the process to step S501.

In step S501, the imaging control unit 302 controls the mirror unit 150 in such a manner that the imaging area becomes the imaging area B1. In step S502, the imaging control unit 302 controls the mirror unit 140 in such a manner that the imaging area B1 continues to be the imaging area for a predetermined frame (e.g., one frame) while the mobile entity is moving. In step S503, the imaging control unit 302 controls the storage unit 202 to store the image data of the imaging area B1 in the storage unit 202 by connecting the image data of the imaging area B1 to the image data of the imaging area A1 in a data structure such that the image data of the imaging area A1 is displayed next to the image data of the imaging area B1. Next, in step S504, the imaging control unit 302 determines that the control of the image capture is not completed and returns the process to step S501. The above-mentioned process is repeated.

According to the present embodiment, the amount of information per pixel can be extended while maintaining the same amount of information per pixel as that captured by a non-wide-angle lens.

Modified Example

A modified example is described below. The main body of the processing in the modified example is the control unit 201. Inspection of tunnels in highways is an important task to ensure the safety and stability of transportation. To accurately detect cracks, rust, and other small details on tunnel walls during inspections, it is necessary to have high quality images that are clearly visible to achieve the same level of accuracy as visual inspections. However, when capturing images of tunnel walls while moving on the road, the optical axis of the camera moves with respect to the tunnel wall during the exposure time, which usually causes motion blur and degrades the image quality of the captured image. One method to solve this problem is to adjust the optical axis of the camera, using a galvanometer mirror, in such a manner that the optical axis of the camera follows the movement of the image capture target.

However, with this method, when one high-speed camera with high-resolution is installed in the inspection vehicle, if the camera angle of view is 3 degrees, it is necessary to travel through the tunnel 60 times to capture a 180-degree image of the tunnel wall. To improve tunnel inspection efficiency, this number of trips must be reduced: by using a single axis galvanometer mirror to change the optical axis of the camera perpendicular to the direction of movement for each image capture, we aim to extend the range that can be imaged with one trip and one camera. As shown in FIG. 4, if sufficient overlap exists for consecutively imaged photos, the imaging range can be increased from one image sequence to two adjacent image sequences.

We propose a system enabling to reduce the number of trips of the vehicle for greater efficiency in inspections under high-speed movement of tunnels in highways. In a modified example, under the condition that the inspection vehicle travels at a speed of 100 km/h, we propose a method to increase the imaging range from one image sequence to two adjacent image sequences.

A galvanometer mirror is driven by PID control, but when the input changes rapidly, the output cannot follow the input accurately, causing motion blur. In addition, the mirror oscillates at the natural frequency thereof at such an input. Since the output is affected and distorted by the inherent physical characteristics of the mirror, we consider the model to be unknown and propose a method without modeling, applicable to any galvanometer mirrors with any physical characteristics and control method. Specifically, the response of the galvanometer mirror with respect to a pulse input is measured, and then an input to the mirror is realized that stops the angle of the mirror during the exposure time of the camera.

To increase the imaging range, it is necessary to achieve a change in the angle of the optical axis of the camera. Considered is a system that captures images in the desired direction in three dimensions. In such a system, under driving conditions at 100 km/h, the imaging angle of the camera must be switched once every 3 ms, and the bandwidth of the system of the galvanometer mirror is not sufficient to handle the bandwidth of the input pulses. There is also a method of tracking a target by driving the galvanometer mirror on the order of ms. However, this method causes motion blur in the captured image since the angle update of the galvanometer mirror is not stopped within the exposure time of the camera.

According to a study that employed a two-inertia rotational drive mechanism model for modeling galvanometer mirrors, it is known that the resonance characteristics of the two-inertia rotational drive mechanism causes vibration at the resonance frequency when the mirror is driven.

Noise at the resonant frequency is generated with respect to the driving of the galvanometer mirror. When this resonance noise is generated, the noise leads to blurring of the captured image.

In the modified example, the galvanometer mirror is disposed in front of the high-speed camera, and then the angle of the galvanometer mirror is switched at high speed in accordance with the exposure timing of the high-speed camera. In that case, it is assumed that the imaging angle of the camera switches perpendicular to the direction of travel of the device. In the case of 100 km/h driving, the galvanometer mirror used to change the optical axis of the camera with respect to the direction of the image sequence is driven so as to be one capture/3 ms. It is assumed that the imaging angle of the camera switches perpendicular to the direction of travel of the device. In the case of 100 km/h driving, the galvanometer used to change the optical axis of the camera with respect to the direction of the image sequence is driven so as to be one capture/3 ms.

Figure 6:
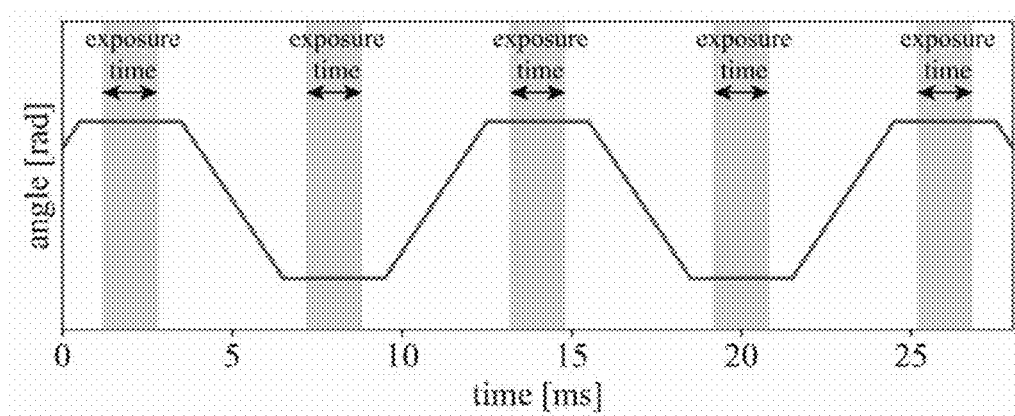
FIG. 6 shows the movement of galvanometer mirrors.

The PID control parameters are set manually by the business and are unknown. With this setting, the galvanometer mirror cannot follow a high-speed step-scanning input since the tracking accuracy decreases when the input changes rapidly. FIG. 6 shows the movement of the galvanometer mirror. To achieve the movement of the galvanometer mirror in FIG. 6, if a square wave with a frequency of 1000/6 Hz and a magnitude of voltage value that changes the optical axis of the camera is used as input, the output is considered to be similar to a trapezoidal wave due to the delay. However, in fact, the time to follow the angle is long with respect to the imaging interval. Hence, the mirror cannot be stationary within the exposure time and a clear image cannot be captured. In addition, although the output is desired to be a trapezoidal wave, it is difficult to model the output of the galvanometer mirror for a steeply varying input, since the output is affected by the physical characteristics of each mirror and the parameters of the PID control, etc. Therefore, we consider that this can be achieved by adjusting the angle variation with multiple pulse waves to make the output a trapezoidal wave by an external input. Using the fact that increasing the voltage value of the pulse wave also increases the angle change of the mirror, the inputs to the mirror are defined as shown in FIG. 6. For the first pulse wave, the height and width are set in such a manner that the peak value of the output is the desired angle. The parameter α is tuned and the one, that results in the smallest angle of mirror movement during the exposure time of the camera, is selected.

Figure 7:
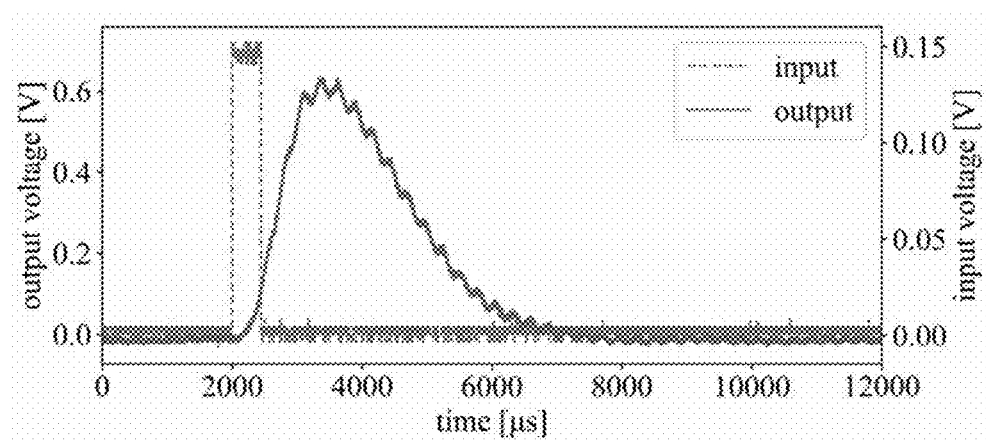
FIG. 7 shows the response of the galvanometer mirrors.

The response of the galvanometer mirror to a pulse input with a voltage value of 0.70 V for height and 450 us for width was measured with an oscilloscope and is shown in FIG. 7. FIG. 7 shows the response of the galvanometer mirror.

Figure 8:
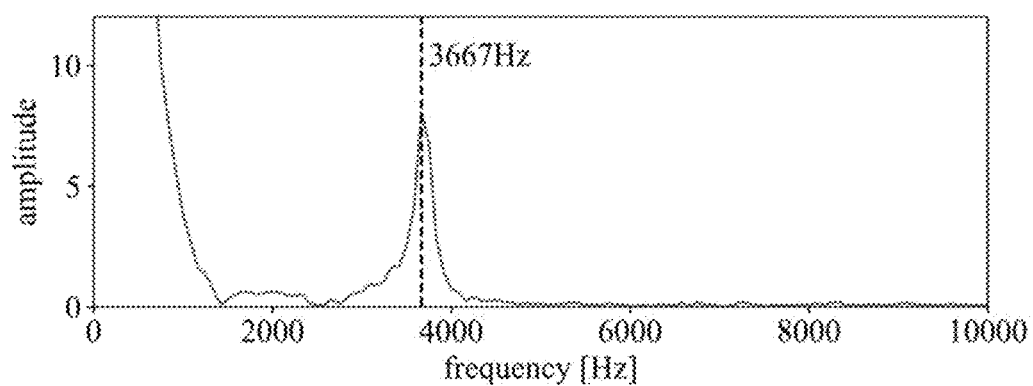
FIG. 8 shows an example of vibration intensity.

FIG. 8 shows the results of the vibration intensity in the frequency domain obtained by adding up and averaging the responses of eight times and then performing a Fourier transform. FIG. 8 shows an example of the vibration intensity, which peaks at around 3667 Hz in the high-frequency unit after 200 Hz. It is considered that 3667 Hz is the unique resonance frequency of the galvanometer mirror used in this variation.

Fourier-transforming the unit rectangular function R(x) with height A and width T yields,

[Equation 1]

$$\mathcal{F}(R(x)) = \int_{-\infty}^{+\infty} R(x)e^{-j\omega x}dx \qquad (1)$$
$$= AT\frac{\sin\frac{\omega T}{2}}{\frac{\omega T}{2}}$$

a Sinc function for the variable ω is obtained, represented as Equation (1). Further, as for each resonance frequency ωr,

[Equation 2]

$$T = \frac{2n\pi}{\omega_r}(n = 0, 1, 2, \dots) \qquad (2)$$

the width T of the pulse input represented as Equation (2) is set, and then, a square wave without resonant frequency components can be generated.

Figure 9:
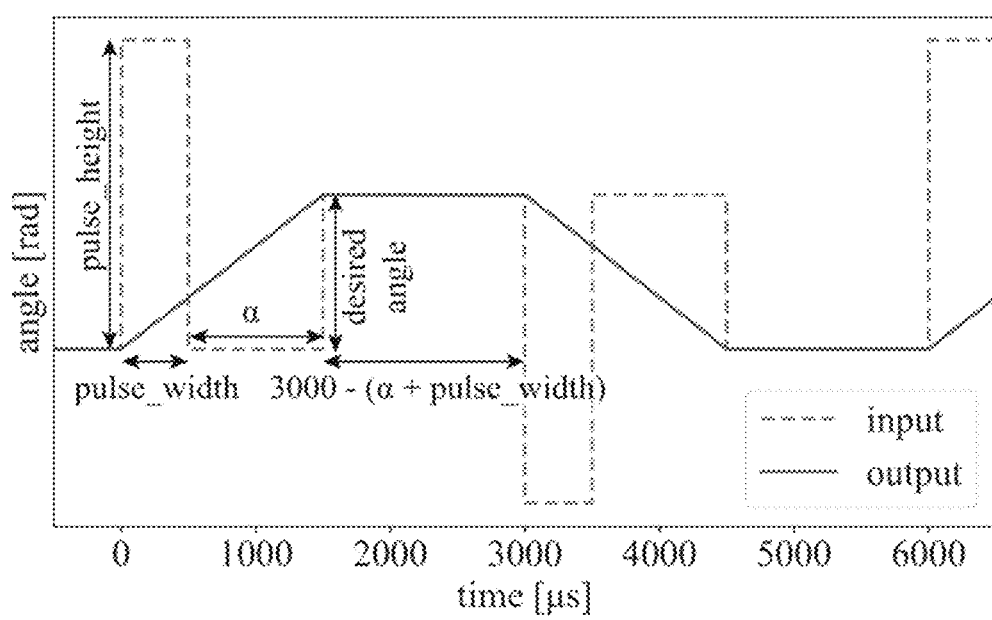
FIG. 9 shows the inputs to achieve the desired trapezoidal output.

FIG. 9 shows the inputs to achieve the desired trapezoidal output. "PULSE_HEIGHT," the height of the first input pulse wave in FIG. 9 is greater than the other modified examples, and the effect thereof on the output at the resonant frequency is large. Therefore, "PULSE_WIDTH," the width of the first pulse wave is selected to be T, where the oscillation intensity at the resonant frequency of the mirror in Equation 2 is small, so as to prevent resonance noise in the galvanometer mirror response. The height of the pulse wave should be set in such a manner that the peak of the angular response of the mirror is at the desired angle with respect to the determined pulse wave width.

The galvanometer mirror used in the modified example is an M3S30mmY mirror from CambridgeTechnology, Inc. The signal to the galvanometer mirror was converted using an AD/DA interface board with 16-bit resolution, LPC-361216, from Interface, Inc. The galvanometer mirror was set by the MINI SAX II analog servo driver to change the angle of the mirror by 3.5 degrees in response to a 0.40 V input. PID control is performed inside the servo driver according to manual control parameters. The input to the galvanometer mirror was a 33220A function generator from Agilent Technology.

In preliminary experiments, the output was observed using a Tektronix MDO3024 oscilloscope. To evaluate the degree of stillness of the galvanometer mirror during the exposure time, a high-speed camera was used to capture images of the luminance that was made still by the laser to determine the amount of movement of the imaging center of the camera. The camera captured 7,000 images while shifting the timing of the exposure by 1 us with respect to the driving cycle of the galvanometer mirror. The optical axis center of the camera was obtained by capturing 30 images for each exposure and averaging the coordinates of the laser bright spots in the images. The high-speed camera used was the SP-12000M-CXP4-XT from JAI.

Figure 10:
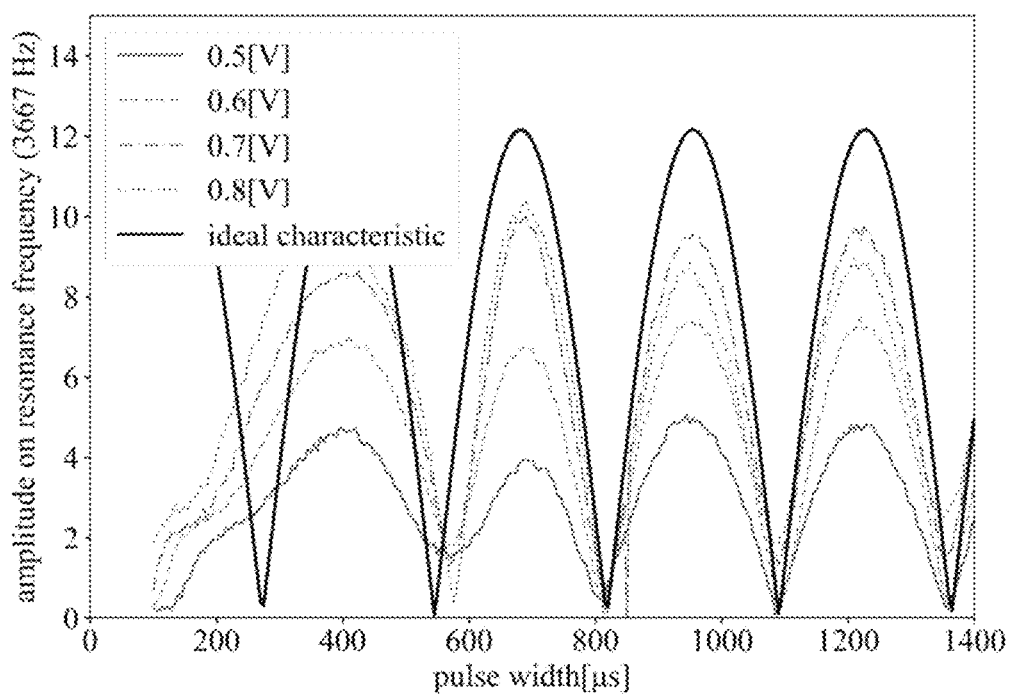
FIG. 10 shows the vibration intensity at the resonance frequency of 3667 Hz.

The pulse input voltage was varied from 0.50 V to 0.80 V in 0.10 V steps and the width was varied from 100 us to 1400 us in 5 us steps for each voltage value, thereby having measured the galvanometer mirror response. The eight measured directions were added and averaged, and then the vibration intensity at this mirror's unique resonance frequency of 3667 Hz is obtained by Fourier transformation. FIG. 10 shows the vibration intensity at the resonant frequency of 3667 Hz. "ideal characteristic" is a plot of Equation (2) at the resonant frequency of 3667 Hz when the pulse width is varied from 100 us to 1400 us in 5 us steps. The results in FIG. 10 show that for the response of the galvanometer mirror to the pulse input, the use of a pulse wave with a small resonant frequency component at the input of the mirror is effective in reducing the resonant noise.

Then, it is revealed that if the resonance frequency into Equation (2) is introduced,

[Equation 3]
$$\text{PULSE\_WIDTH} = 262.9 \, k \, (K = 2, 3, 4, \ldots) \quad (3)$$

the resonance noise was reduced when set to PULSE_WIDTH [μs] as shown in Equation (3).

In Equation (3), the galvanometer mirror was driven with the input shown in FIG. 7 with k=5, i.e., pulse_width=1340 μs. For a fixed width pulse input, PULSE_HEIGHT=0.75 V was set in such a manner that the peak was 0.40 V for the response of the mirror. The parameter α=620 us was used.

Figure 11:
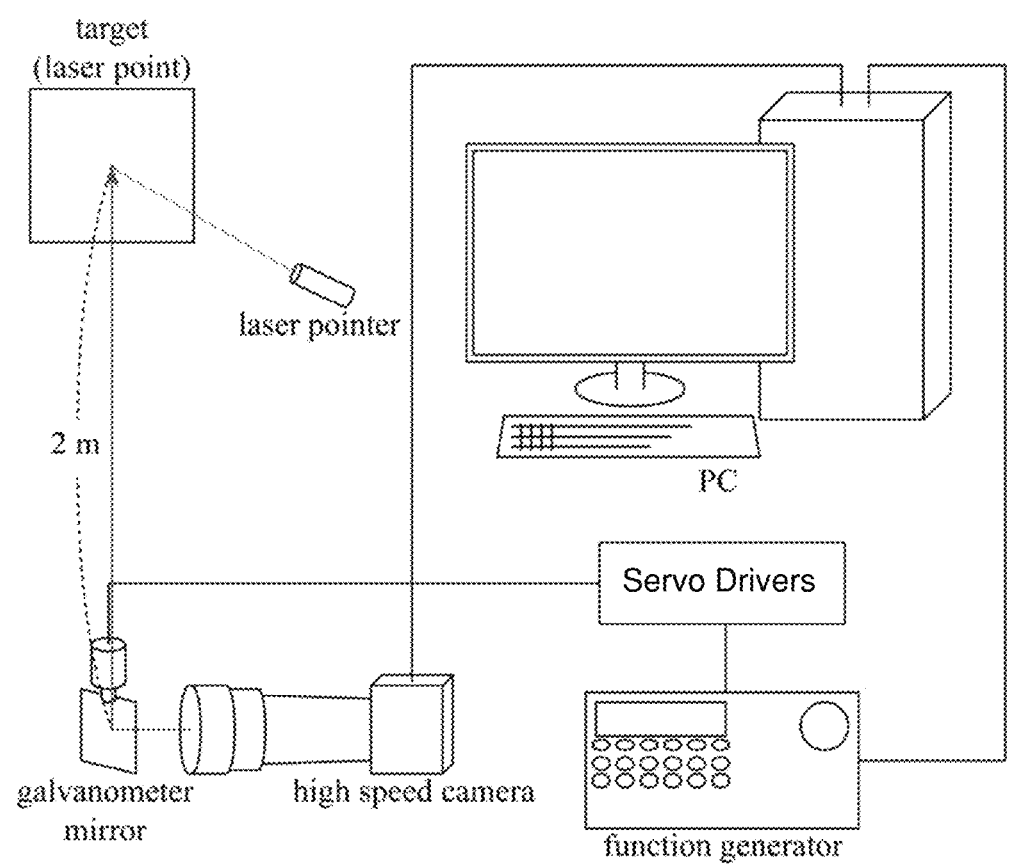
FIG. 11 shows an example of an evaluation apparatus.

The shift of the imaging center of the camera was determined by capturing images of a stationary bright spot using a laser pointer with a high-speed camera. The camera captured 7,000 images while shifting the timing of the exposure by 1 us with respect to the driving cycle of the galvanometer mirror. The optical axis center of the camera was obtained by capturing 30 images per exposure and averaging the coordinates of the laser bright spots in the images. The high-speed camera used was the SP-12000M-CXP4-XT from JAI. A target 2-m away from the camera was imaged as a fixed visible laser point as shown in FIG. 11, and the blurriness of the captured image was evaluated. FIG. 11 shows an example of the evaluation system.

Figure 12:
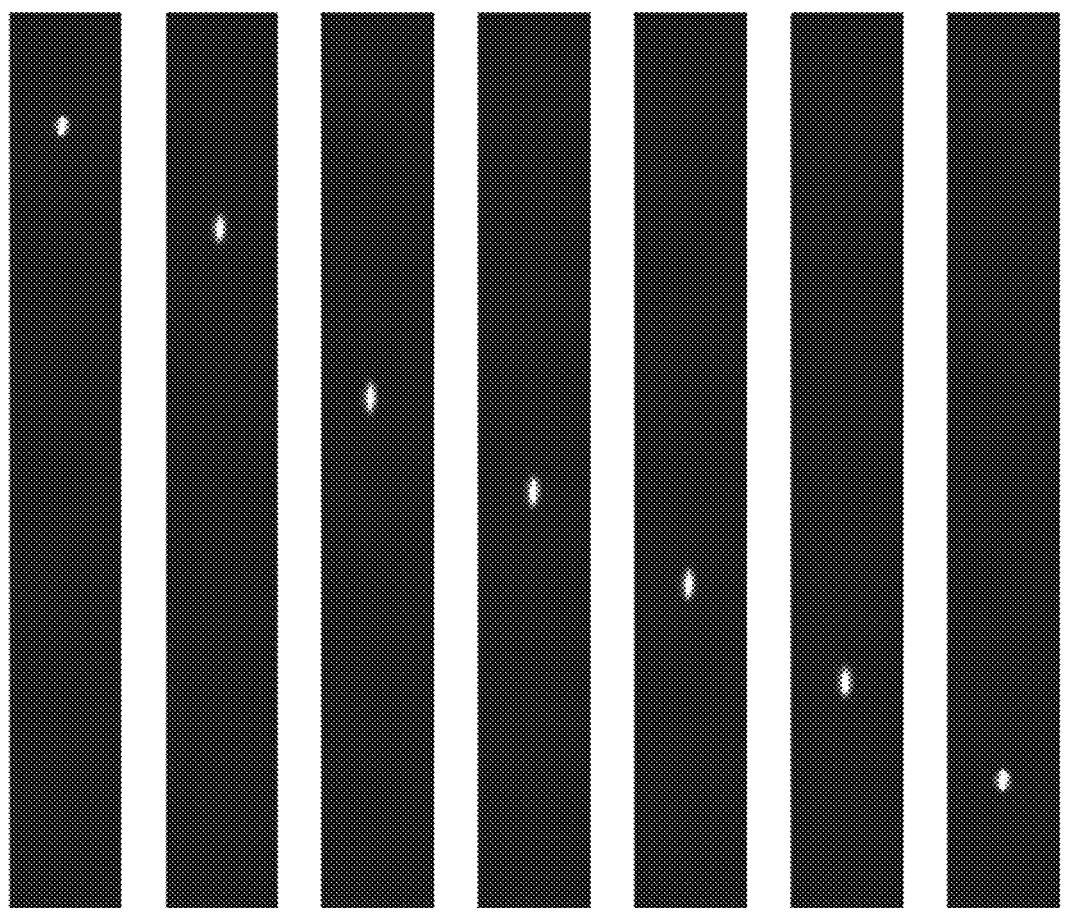
FIG. 12 shows a captured image.
Figure 13:
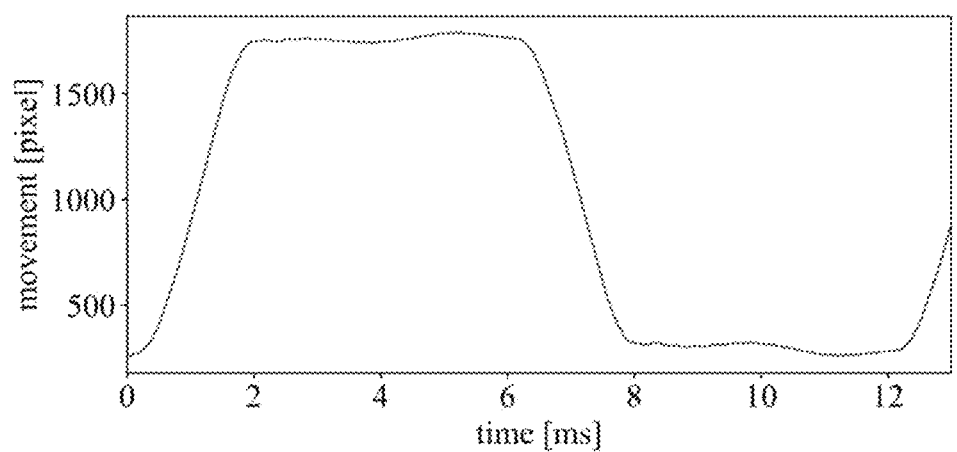
FIG. 13 shows the response to pulse input.
Figure 14:
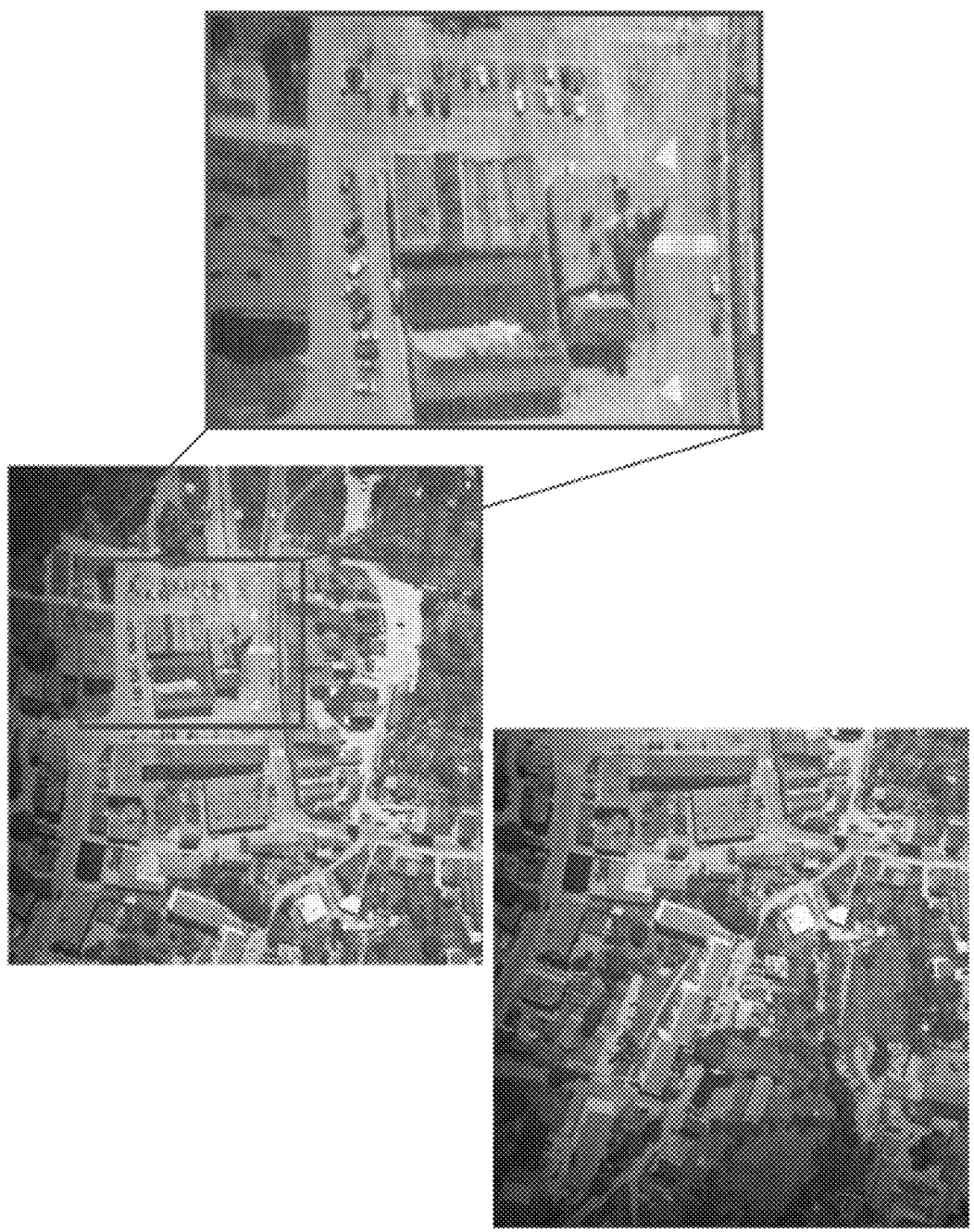
FIG. 14 shows an example of the captured image.
Figure 15:
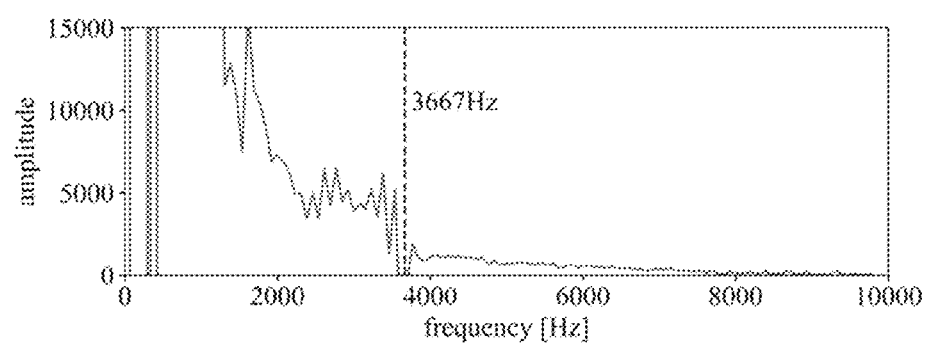
FIG. 15 shows the frequency response to the pulse input.

Under these conditions, FIG. 13 plots the coordinates of the light source from the captured image shown in FIG. 12 over time. FIG. 12 shows the captured image. FIG. 13 shows the response to the pulse input: when the camera was exposed for 1000 μs, the shift of the center of imaging was 1.27% of the shift of the center of imaging for each image capture for each exposure. FIG. 14 shows a photo taken by the system at 2 m away. In this photo, a 1 mm wide white line was successfully detected. The output was converted to the frequency domain, which is shown in FIG. 15. The vibration intensity at the resonance frequency of 3667 Hz was reduced, indicating that the method of Variation 1 is effective in preventing the generation of resonance noise due to the rigid characteristics of the galvanometer mirror. FIG. 15 shows the frequency response to the pulse input.

Figure 16:
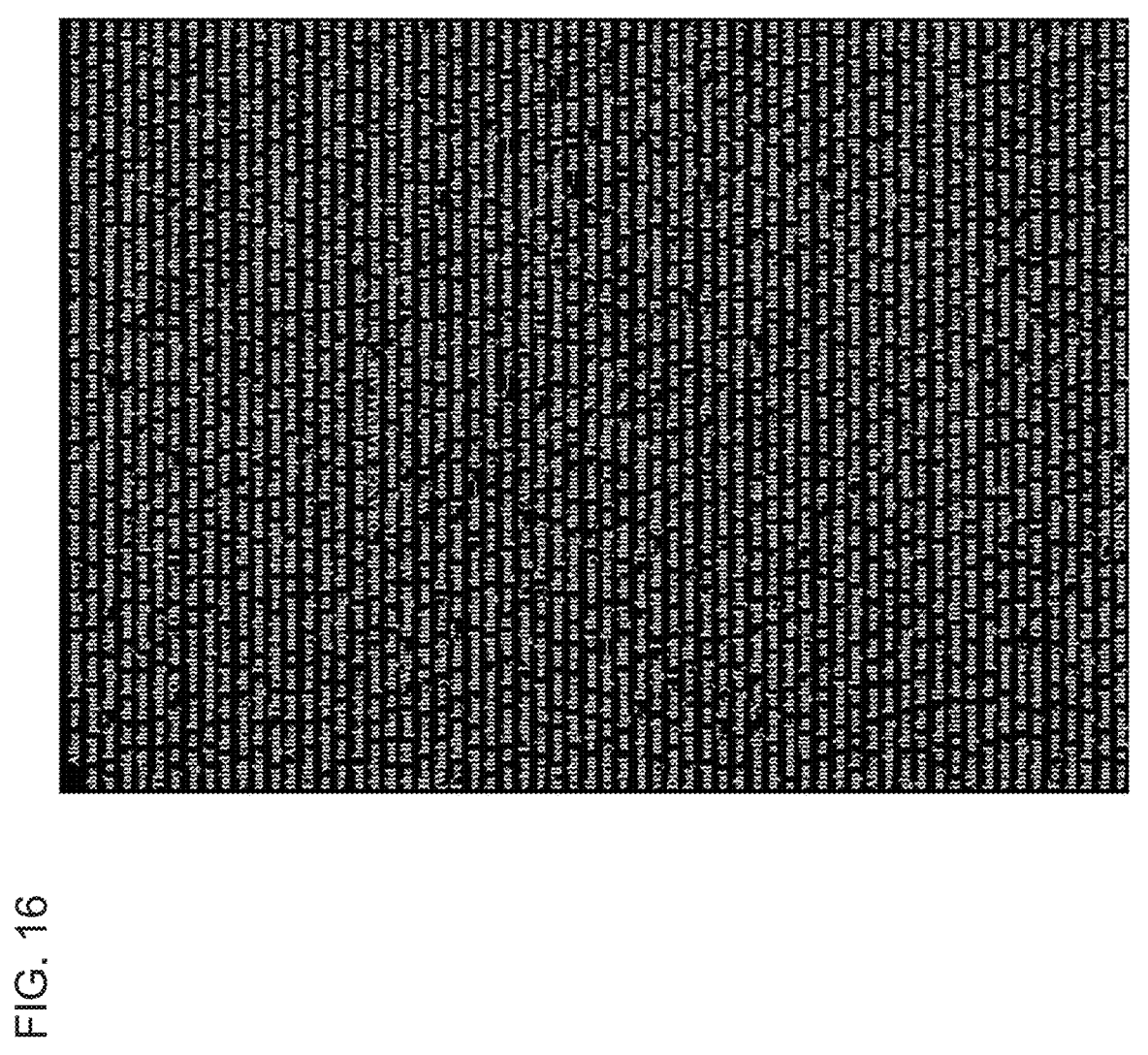
Figure 17:
FIG. 17 shows a mode in which image-mosaicing is performed manually on the result of capturing an image with a wider angle of view, projected by a high-speed projector.

FIG. 16 shows an example of an image with a text string. FIG. 17 shows the result of manual image-mosaicing of the image in FIG. 16 projected by a high-speed projector and captured by the information processing system 1000 with a wider angle of view. In FIG. 17, six images have been mosaicked. The information processing system 1000 captured the 1024×768-pixel image in FIG. 16 against the screen at 1000 fps with a high-speed projector to flow from right to left at a rate of 50 pixels/ms. The information processing system 1000 also captured images at a resolution of 3840×1804 pixels at a frame rate of 1 image/3 ms while switching the angle of view of the camera every 3 ms. The six images captured were lined up in FIG. 17. It was confirmed that the angle of view could actually be extended for roughly twice. This means that the information processing system 1000 can be applied to a single camera even in situations where high-speed imaging with high resolution is required. Since the high-speed projector switches images discretely every 1 ms, motion blur does not occur, unlike the capturing in a moving environment where the information processing system 1000 is expected to be applied.

Other Modified Examples

Other modified examples are described below.

There may be more than one viewing direction switched by the mirror unit 150 in another modified example.

In another modified example of the information processing system 1000, two mirror units 140 may be provided, and the motion blur of the component perpendicular to the direction of movement can also be eliminated.

In the information processing system 1000, a pupil-shift optical system may be provided between the imaging unit 110 and the mirror unit 140 and the mirror unit 150 to shift the pupil of the camera to the middle of the mirror unit 140 and the mirror unit 150. By using this configuration, the size of the mirror can be reduced while maintaining the angle of view.

The imaging control unit 302 in another modified example may control the mirror unit 140 based on the speed of the mobile entity.

If the speed of movement is known, the imaging control unit 302 may control the mirror unit 140 in an open loop.

In the information processing system 1000, the optical axis may be separated by a half mirror in such a manner that the imaging unit for inspection and the imaging unit for visual feedback used to drive the mirror unit 140 are separately implemented.

APPENDIX

The present disclosure may be provided in each of the following aspects.

The information processing system, wherein: the first mirror unit is used in such a manner that the imaging range of the imaging unit is a constant area of the subject during an exposure time in at least one frame of the imaging unit.

The information processing system, wherein: the first mirror unit is used to control the gaze direction in an opposite direction of a movement of the mobile entity, and the second mirror unit is used to control the gaze direction in a direction perpendicular to a direction of a movement of the mobile entity.

The information processing system, further comprising an imaging control unit configured to control: the first mirror unit in such a manner that the imaging range of the imaging unit is a constant area of the subject, and the second mirror unit to switch the gaze direction of the imaging unit.

The information processing system, wherein: the imaging control unit is configured to control the second mirror unit to switch the gaze direction of the imaging unit based on an input of a pulse signal based on a resonance frequency of the second mirror unit.

The information processing system, wherein: T, a width of the pulse signal, is represented as: T=2nπ/ωr, where ωr is the resonance frequency (n is a natural number greater than or equal to zero).

The information processing system, wherein: the imaging control unit is configured to correct the width of the pulse signal based on an output signal from the second mirror unit.

The information processing system, wherein: a height of the pulse signal is greater than an amplitude corresponding to a maximum stroke of the second mirror unit.

The information processing system, wherein: the imaging control unit configured to obtain the resonance frequency of the second mirror unit based on a captured image captured by the imaging unit.

The information processing system, wherein: the first mirror unit and the second mirror unit are galvanometer mirrors.

The information processing system, wherein the mobile entity is a vehicle, and the subject is a wall surface in a tunnel.

Of course, the above aspects are not intended to limit the present disclosure.

For example, a computer-readable, non-transitory storage medium that stores the program described above may be provided.

The above-mentioned embodiments and modified examples may be executed in any combination.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

What is claimed is:

1. An information processing system provided at a mobile entity, comprising:
    a camera configured to capture an image of a subject; and
    a plurality of mirror units, wherein:
    at least a first mirror unit and a second mirror unit of the plurality of mirror units are disposed on an optical axis of the camera,
    the first mirror unit is configured to adjust an imaging range of the camera to a constant area of the subject, and
    the second mirror unit is configured to switch a gaze direction of the camera.

2. The information processing system according to claim 1, wherein:
    the first mirror unit is configured to adjust the imaging range of the camera to the constant area of the subject during an exposure time in at least one frame of the camera.

3. The information processing system according to claim 1, wherein:
    the first mirror unit is configured to control the gaze direction in an opposite direction of a movement direction of the mobile entity, and
    the second mirror unit is configured to control the gaze direction in a direction perpendicular to the movement direction of the mobile entity.

4. The information processing system according to claim 1, further comprising a processor configured to execute a program stored in a memory so as to cause:
    the first mirror unit to adjust the imaging range of the camera to the constant area of the subject; and
    the second mirror unit to switch the gaze direction of the camera.

5. The information processing system according to claim 4, wherein:
    the processor is further configured to cause the second mirror unit to switch the gaze direction of the camera based on an input of a pulse signal based on a resonance frequency of the second mirror unit.

6. The information processing system according to claim 5, wherein:
    T, a width of the pulse signal, is represented as:
    T=2nπ/ωr, where ωr is the resonance frequency and n is a natural number greater than or equal to zero.

7. The information processing system according to claim 5, wherein:
    the processor is further configured to correct a width of the pulse signal based on an output signal from the second mirror unit.

8. The information processing system according to claim 5, wherein:
    a height of the pulse signal is greater than an amplitude corresponding to a maximum stroke of the second mirror unit.

9. The information processing system according to claim 5, wherein:
    the processor is further configured to obtain the resonance frequency of the second mirror unit based on a captured image captured by the camera.

10. The information processing system according to claim 1, wherein:
    the first mirror unit and the second mirror unit are galvanometer mirrors.

* * * * *